United States Patent [19]

Sola

[11] Patent Number: 4,948,390

[45] Date of Patent: Aug. 14, 1990

[54] COMPRESSED AIR MODIFIER

[76] Inventor: Antonio Sola, Lot 31 Badgery's Creek Road, Bringelly, New South Wales 2171, Australia

[21] Appl. No.: 241,961

[22] PCT Filed: Aug. 19, 1987

[86] PCT No.: PCT/AU87/00277

§ 371 Date: Jun. 20, 1988

§ 102(e) Date: Jun. 20, 1988

[87] PCT Pub. No.: WO88/01195

PCT Pub. Date: Feb. 25, 1988

[30] Foreign Application Priority Data

Aug. 19, 1986 [AU] Australia ............................ PH7456

[51] Int. Cl.[5] ............................................ B01D 47/00

[52] U.S. Cl. ........................................ 55/21; 55/90; 55/257.6; 55/465; 55/270

[58] Field of Search ...................... 55/89, 90, 185, 186, 55/229, 270, 257.3, 257.6, 462, 465, 464, 270, 21

[56] References Cited

U.S. PATENT DOCUMENTS

| | | | |
|---|---|---|---|
| 3,367,402 | 2/1968 | Cross et al. | 55/186 X |
| 3,613,333 | 10/1971 | Gardenier | 55/89 |
| 4,149,859 | 4/1979 | Vigesdal | 55/89 |
| 4,166,799 | 9/1979 | Giacobbe | 55/89 X |
| 4,359,329 | 11/1982 | Willeitner | 55/186 |
| 4,469,493 | 9/1984 | Tuovinen et al. | 55/89 |
| 4,479,379 | 10/1984 | Tarcy | 55/270 X |

*Primary Examiner*—Bernard Nozick
*Attorney, Agent, or Firm*—Armstrong, Nikaido, Marmelstein, Kubovcik & Murray

[57] ABSTRACT

An apparatus to introduce a vaporized chemical agent into a compressed air supply system comprising an air inlet (25), a chemical agent storage chamber (15), and an air/chemical agent mixing chamber (13) which includes a baffle means (14) to promote turbulence and extract liquid phase chemical droplets. There is a supply means (17) to spray a controlled quantity of the chemical agent into the mixing chamber and an outlet (20) to allow removal of extracted liquid phase chemical agent from the mixing chamber (13).

6 Claims, 3 Drawing Sheets

COMPRESSED AIR MODIFIER

Compressed air is used extensively in industry to provide a variety of services associated with numerous activities such as propulsion, rotation, inflation and atomisation. In many instances it is desirable to control or modify a supply of compressed air in relation to such factors as temperature, humidity, flow rate and chemical composition. The present invention relates to the modification of compressed air by the generation of vapor phase chemical agents and has been found to have applications in such activities deodorization corrosion inhibition, fumigation and paint curing.

The preferred embodiment of the present invention has been found to be particularly useful in the treatment and rapid curing of substrate coatings such as paints. Consequently, the treatment and rapid curing of substrate coatings is emphasised herein but it will be clear from the examples that the present invention has numerous substrate coatings. Although the present invention has developed from paint curing technology, the present invention is, not limited to use in the paint curing field.

Australian patent No. 476431 describes a pre-polymer coating vehicle, the drying of which can be greatly accelerated by treatment of the vehicle with a drying medium after application to a substrate. Australian patent application No. 80608/82 discloses a method of coating a substrate which comprises coating an aromatic hydroxyl-functional compound which further comprises substituted or unsubstituted 1,2-dihydroxybenzene or derivatives thereof in a multi-cyanate curing agent therefor which is, after coating onto the substrate exposed to a vaporous tertiary-amine catalyst to rapidly cure said applied film. Furthermore, Australian patent application No. 39524/85 discloses a polyurethane composition in which the drying rate is also accelerated by a catalyst. Other so-called catalyst curable painting systems are disclosed in Australian patent application Serial Nos. 88361/82, 87415/82 and 84684/82. Reference to Australian patent application No. 35870/84 will show that there are a very large number of vapor permeation curable coatings within the prior art which include, by way of example only, U.S. Pat. Nos. 2967117, 4267239, 4343839, 4365039, 4366193 and 4396647.

In view of the foregoing, it is apparent that a great deal of prior art exists in this field. It should be realized that not only is the present invention particularly adapted for use in conjunction with any one of the foregoing systems or a particular catalytic agent, it has uses outside the painting field.

The process of applying a drying agent, as disclosed in Australian patent No. 476,431, is to place the coated substrate in ,a drying chamber and then to introduce the vaporized drying agent. Numerous curing chambers have been proposed that would allow an atmosphere bearing an appropriate vapor phase curing agent to be introduced into and extracted from a curing chamber which also contains an article, the substrate of which has been coated with a curable paint. Examples of such curing chambers can be found in U.S. Pat. Nos. 3851402 and 3931684, as well as Australian patent application Nos. 35479/84 and 25783/84. The problem with the use of curing chambers is that the size of the articles that can be cost-effectively coated is restricted by the expense associated with the installation of a sufficiently large treatment chamber. For example, the installation of treatment booths of sufficient size to enclose a motor car is likely to represent a large capital cost to a smash repair business. Furthermore, as such a large booth would be lacking in mobility, a degree of flexibility would be lost from an existing operation by the installation of such a treatment booth. In operations where closed booths are used, extensive modification would be required so as to allow the drying agent to be introduced during the drying period and, also, to be extracted from the booth after treatment. Thus, even for an existing enclosed booth operation, expensive further modifications would, be required.

Alternatively, Australian patent application Serial No. 23010/83 describes a process which enables the simultaneous application of a vaporous drying agent and a coating vehicle for an electrostatically deposited coating using hand held equipment, thus avoiding the need for a booth into which a catalyst bearing atmosphere may be introduced. The apparatus disclosed therein is deficient in that the means by which the drying agent is supplied is an "add-on" device which uses a separate supply means to the coating vehicle supply of the electrostatic gun disclosed therein. Consequently, in addition to a drying agent supply means being needed, a modified coating gun would also be required. Also, a method of applying paints using conventional pneumatic techniques is disclosed in Australian patent Application Serial No. 25447/84. A number of catalyst vapor generators are discussed therein, however, it is noted that the vapor generator disclosed in U.S. Pat. No. 4051886 is considered to be representative of the art.

It should also be noted that a vapor generator is also disclosed in Australian patent application No. 41966/85. The vapor generating device disclosed in AU41966/85 appears, like the present invention, to be suited to applications other than painting, as the making of foundary and cores is discussed in the preamble thereof. The device of AU 41966/85 is a complex machine, requiring the maintenance of gas cylinders, the matching or balancing of two pressure regulators and the use or derivation of charts for successful operation.

Another vapor generator is disclosed in Australian patent application No. 36214/78. This apparatus blows air through baffles across a gravity feed supply of chemical agent and works on a principle similar to an evaporative air conditioner, except that the evaporation of the chemical agent is the desired result rather than the lowering of air temperature. The invention of 36214/78 is useful the production of low pressure vapor bearing atmospheres such as are utilized in the prior art curing chambers but is not capable of connection to use in conjunction with a conventional high pressure pneumatic source.

The present invention seeks to provide an on-line compressed air modifying apparatus to provide a vaporized chemical agent into a compressed air supply system.

According to a first aspect of the present invention there is provided an apparatus to introduce a vaporized chemical agent to a compressed air supply system comprising:

an air supply inlet, a chemical agent storage chamber, a chemical agent inlet means, an air/chemical agent mixing chamber communicating with said chemical agent inlet means in gaseous communication with said air supply inlet, said chamber further comprising a baffle means to promote turbulence in said mixing chamber and to extract airborne droplets of said chemical agent from said mixing chamber, supply means to spray a controlled quantity of chemical agent from said chemical agent storage chamber to said mixing chamber in response to changes in pressure within said mixing chamber, means to remove liquid accumulated by droplets extraction in said mixing chamber, and an air supply outlet means communicating with a part of said mixing chamber containing air from which airborne droplets have been extracted and adapted to pass air and vaporized chemical agent out of said mixing chamber.

According to a second aspect of the present invention there is disclosed a method of introducing a vaporized chemical agent into a compressed air supply system comprising:

supplying compressed air of a predetermined pressure to an air/chemical agent mixing chamber, spraying a quantity of chemical agent in a non-vapor phase into said mixing chamber in response to changes in pressure within said chamber, producing turbulence in and extracting airborne. droplets from said chamber by baffle means and removing liquid chemical agent formed by said droplet extraction from said mixing chamber.

The present invention will now be described by way of reference to the accompanying drawings, in which:

FIG. 1 shows a first embodiment of the present invention, designated by numeral 10, connected to a compressed air supply system.

Figure 1:
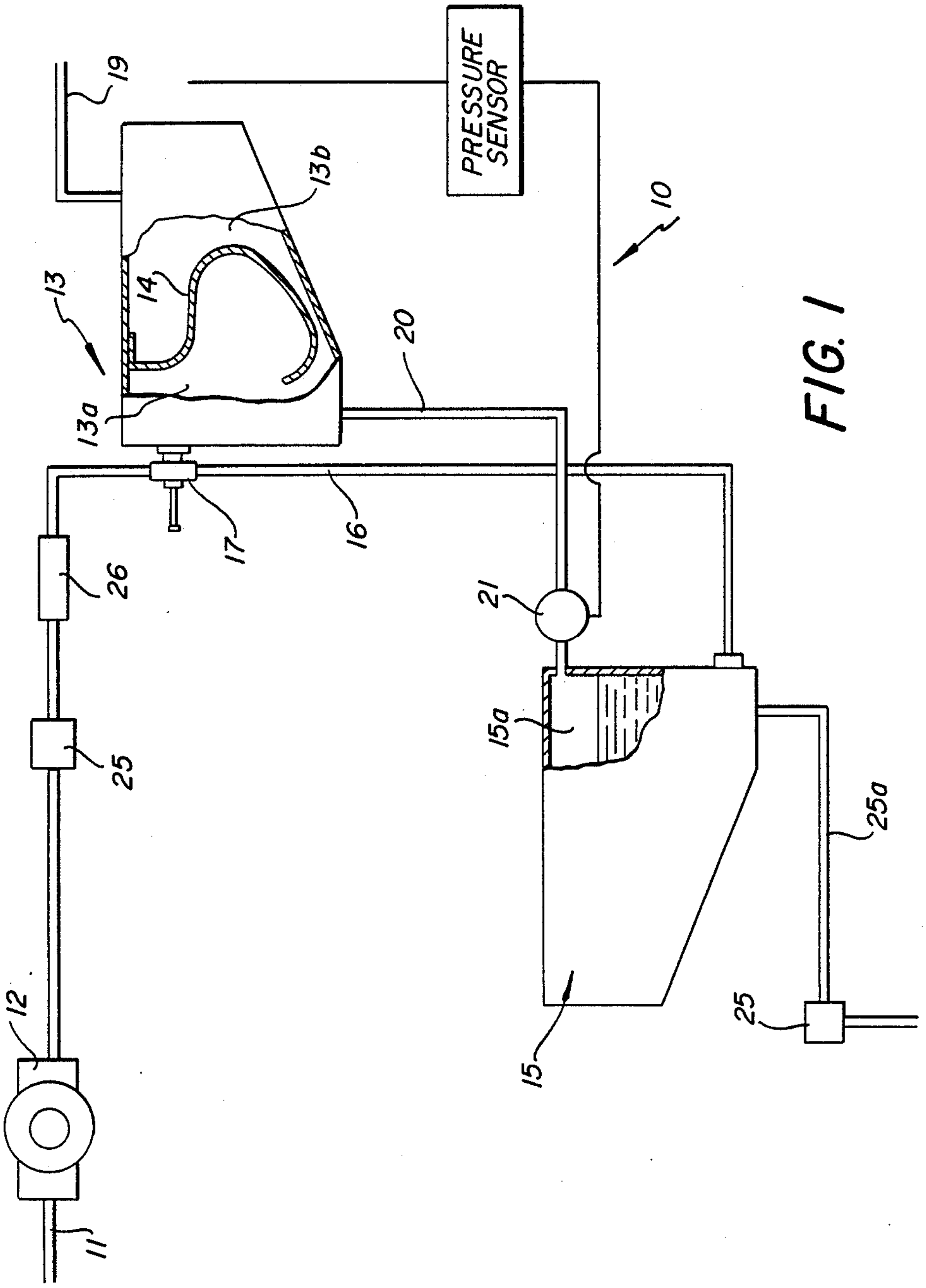
FIG. 1 is a schematic representation of a first embodiment of the present invention.

A compressed air inlet 11 communicates with a pressure control means 12, which in turn communicates with an air/drying agent mixing chamber 13. The mixing chamber 13 is further partially divided by a baffle means 14 into sub-chambers **13*a* and 13*b***.

A chemical agent is stored within chamber 15 and can be transferred to the mixing chamber 13 via hydraulic line 16 and venturi jets 17. A drain pipe 20 allows the mixing chamber 13 to communicate via a pressure responsive valve 21 to the storage chamber 15. An air outlet 19 is provided on mixing chamber 13 in communication with the sub-chamber **13*b*. In use, a supply of compressed air is connected to the pressure inlet 11 and the pressure controller 12 allows air to enter the mixing chamber 13 until a predetermined pressure is achieved therein. Compressed air is also transferred from the mixing chamber 13, via pipe 20 and pressure responsive valve 21 to the chemical agent storage chamber 15, until a predetermined pressure is also achieved in a head space 15*a* in storage chamber 15. Solenoid operated control valves 25 throughout the apparatus 10 allow individual integers of the preferred embodiment to be fluid isolated as desired. A one way valve 26 prevents reflux of chemical agent toward the pressure regulator 12**.

When the air outlet 19 is opened, air escapes from sub-chamber **13*b* and is replaced by air in sub-chamber 13*a*. In response to the drop in air pressure in chamber 13, further compressed air is allowed to enter the mixing chamber 13 by the pressure controller 12, thus drawing in airborne chemical agent through venturi jets 17 and spraying same into the mixing chamber 13. The air and chemical agent turbulently combine in sub-chamber 13*a* and this mixture passes a turbulance enhancing baffle means 14, to sub-chamber 13*b*. Because liquid droplets are more massive than vapor molecules, a baffle means which promotes rapid directional change in air flow, will cause droplets to impact on the baffle and be extracted from the air. The air in sub-chamber 13*b* therefore contains air, vaporized chemical agent, and a minimal number of liquid chemical agent droplets. Liquid extracted from the air in sub-chamber 13*a* drains to the lower part of the mixing chamber 13, where the drain pipe 20 is located. As the chemical agent is emptied from the chemical agent storage chamber 15, the pressure therein drops and, when sufficiently low, the pressure sensitive valve 21 reopens allowing the pressure in the storage chamber to be restored to the previous level. When this happens, extracted liquids are transported along the drain pipe 20 and are thus transferred to the storage chamber 15. This system is beneficial in that it allows extracted chemical agents to be recycled. A solenoid operated control drain 25*a* allows the chemical agent to be drained from the storage chamber 25** when the apparatus is not in use.

The present invention can be used in conjunction with any of the numerous chemical curing agents used to accelerate the drying of paint systems such as those of the prior art referred to above. As stated, the present invention is not limited to use in conjunction with chemical drying agents and has been used in a fumigation application to provide a supply of air containing a vaporized insecticide.

The mixing chamber 13 of FIG. 1 is shown in a cutaway form to allow the baffle means 14 to be illustrated. It should be realized that the baffles means 14 abuts the side walls of the mixing chamber 13 and only a small clearance is provided between the bottom of the baffle 14 and the bottom of the mixing chamber. This is to ensure that the possibility of compressed air containing chemical, agent droplets by-passing the baffle 14 is minimized and to prevent the build up of any extracted liquid chemical agent in sub-chamber **13*b***.

The baffle of FIG. 1 is of an arcuately shaped metal plate and is perforated in an attempt to promote turbulance. The applicant has discovered that the alternative mixing chamber arrangement of FIG. 2 to be an improvement over the arrangement of FIG. 1 ensuring that airborne droplets of liquid chemical agent are completely extracted from the compressed air supply whilst still promoting turbulence.

Figure 2:
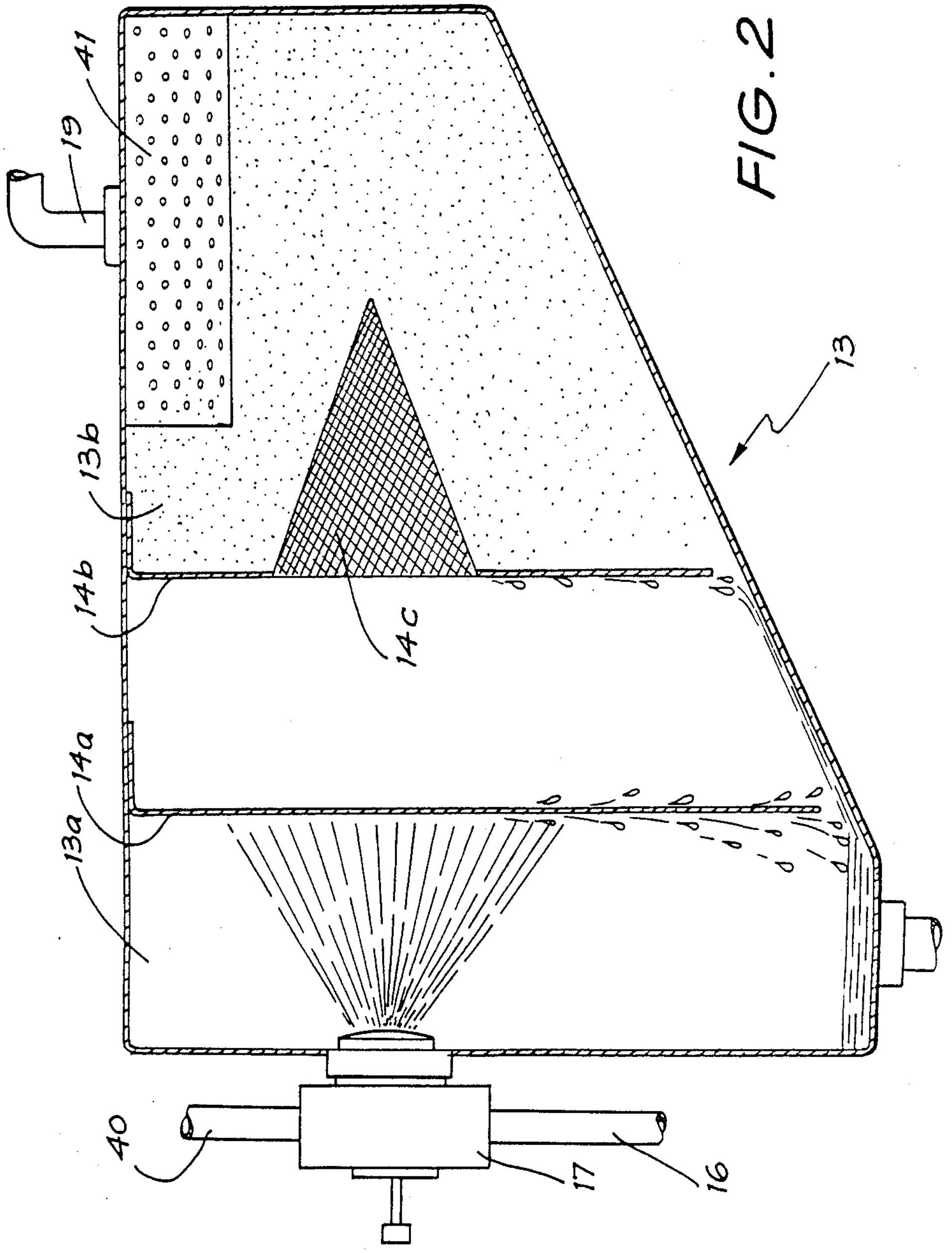
FIG. 2 is a section view of an alternative mixing chamber to that illustrated in FIG. 1.

In FIG. 2 compressed air is supplied through air line 40 and chemical agent is fed in liquid form through a hydraulic line 16 to a venturi jet 17. Compressed air is introduced into the mixing chamber 13 in the previously described manner drawing with it a spray of the chemical agent. In this embodiment the baffle means separating sub-chambers **13*a* and 13*b* comprises a first vertical baffle 14*a*, a second vertical baffle 14*b* and a conical baffle 14*c*. A final outlet baffle 41 encloses the air outlet 19. It has been found that an arcuately shaped baffle means is not essential for the promotion of turbulence and the arrangement of FIG. 2** comprises the preferred baffle means.

Although by no means limiting, the applicant has discovered that if the first vertical baffle is perforated with circular holes of approximately 3mm diameter of 10mm spacings and if the second baffle is perforated with holes of approximately 1.5mm diameter at 10mm spacings with a space of approximately 30mm between vertical baffles 14a and 14b and the baffles are spaced approximately 40mm apart, good results can be achieved. The conical baffle 14c of the preferred embodiment is made from metal gauze and is located to intercept any spray from the venturi jet 17 which may pass through both the first and second baffles 14a and 14b. A space of approximately 10mm below the baffles 14a and 14b allows extracted chemical agent to drain to the return pipe 20 for recycling. Although not essential to the present invention, all components within the mixing chamber 13 are preferably made from stainless steel or other corrosion resistant material to ensure a long and low maintenance life for apparatus in accordance with the present invention.

Figure 3:
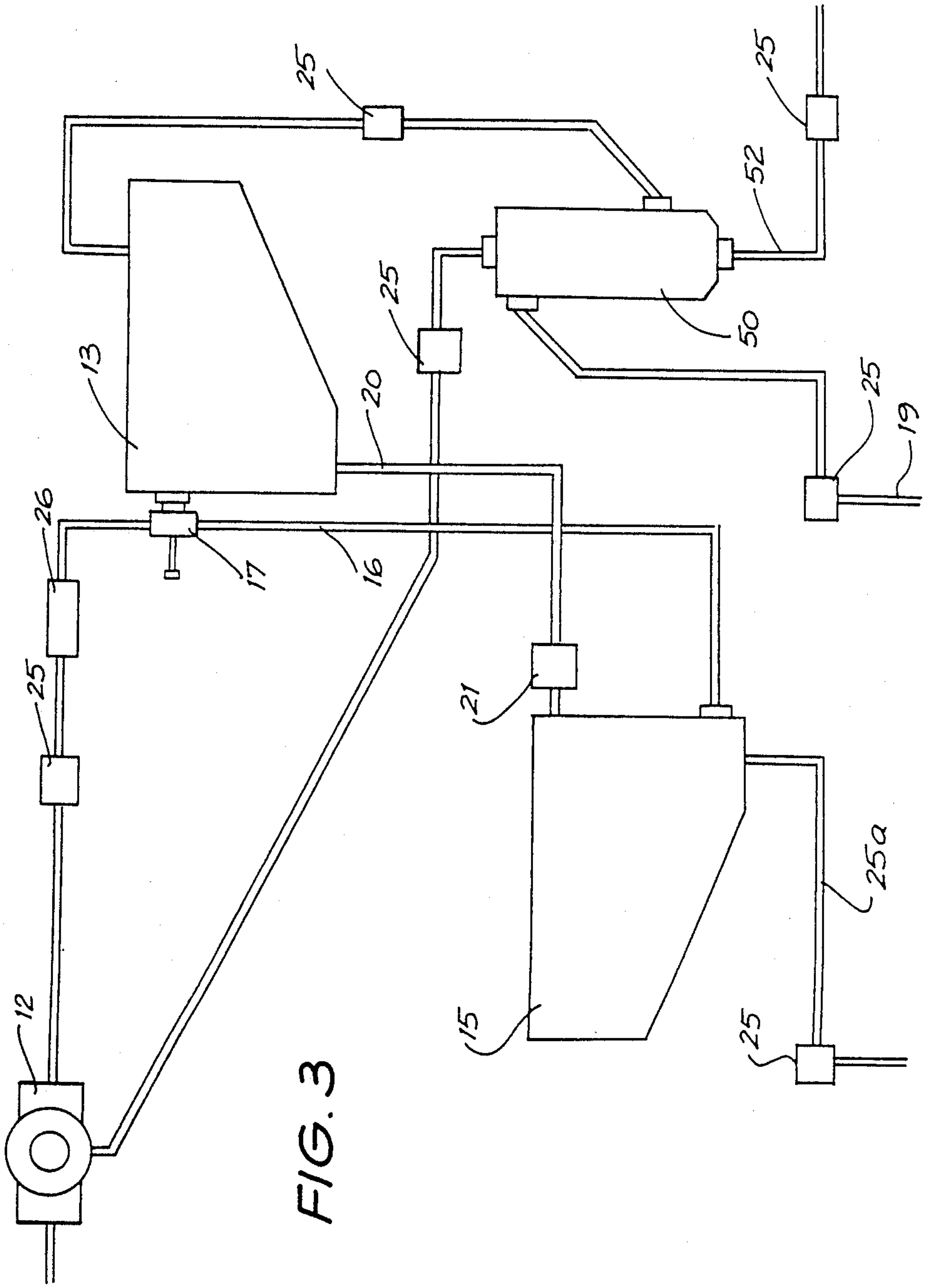
FIG. 3 shows a further embodiment of the present invention which incorporates an analysing tank.

Referring to FIG. 3, it can be seen that it is also possible to include an analysing chamber 50 in embodiments of the present invention. Sensors (not illustrated) within the chamber can provide data such as chemical agent concentration, humidity, air pressure and temperature which may be of use to an operator. The analysing chamber 50 is connected in gaseous communication by way of a solenoid operated control valve 25 to the pressure regulator 12 and has a separate discharge line 52 to facilitate the flushing of residual chemical agent laden air after use.

The following examples are provided to illustrate the possible applications of the present invention.

EXAMPLE 1

A proprietary two component white acrylic polyurethane finish commonly used for decoration in the marine and aircraft industries was prepared according to the manufacturers instructions. The following parameters applied.

| | |
|---|---|
| Mixing Ratio: | 2:1 Part A: Hardener |
| Viscosity: | 22 seconds ford cup No. 4 after 20% reduction with recommended thinners. |
| Mixed Pot Life: | 12 hrs @ 25° C. |

The reservoir of the compressed air modifier was charged with a mixture of a tertiary amine containing small percentages of an organo metal in the following proportions:

| | |
|---|---|
| Dimethylethanolamine | 98 v/v |
| Dibutyl tin dilaurate | 2 v/v |
| | 100 |

Fibreglass panels were prepared by first sanding them with 1000 grade wet and dry paper and then solvent wiping with a standard degreasing solution. The white paint was applied with two passes from a Samson spray gun model SMS at 55 psi so that a wet film weight of approx. 100 nucions was deposited. The gun was in turn attached to the (a) compressed air modifier (C.A.M.) and (b) directly to the compressor (control). The following results were obtained in minutes:

| | DUST FREE | PRINT FREE | TAPE FREE |
|---|---|---|---|
| (a) C.A.M. | 15 | 30 | 70 |
| (b) CONTROL | 45 | 60 | 200 |

EXAMPLE 2

A proprietary epoxy based two pack system containing zinc chromate anti-corrosive pigments was prepared according to the manufacturers instructions.

| | |
|---|---|
| Mixing Ratio: | 2:1 Part A: Hardener |
| Viscosity: | 19 secs Ford cup 4 after 33% reduction with 50:50 MEK:TOLUOL |
| Mixed Pot Life: | 8 hours @ 25° C. |

The reservoir of the compressed air modifier was charged with a mixture of a tertiary amine catalyst and a difunctional primary amine reactant in the following proportions:

| | |
|---|---|
| Tetramethyl Ethylene diamine | 66 parts v/v |
| Ethylene diamine | 34 parts v/v |
| | 100 |

The primer was then applied to a number of bonded phosphated steel panels utilizing a samson spray gun model SMS at a pressure setting of 50 p.s.i. The gun was in turn attached (a) to a compressed air modifier in accordance with this invention (b) directly to the compressor the following times were noted.

| | DUST FREE | PRINT FREE | TAPE FREE |
|---|---|---|---|
| (a) C.A.M. | 5 | 10 | 20 |
| (b) CONTROL | 60 | 120 | 400 |

* NOTE 1: All times are in minutes
** NOTE 2: Solvent resistance was ascertained as the time taken to pass 20 double rubs with Xylol.

EXAMPLE 3

A clear lacquer was prepared using a proprietary melamine formaldehyde resin in alcohol according to the following ratios:

| Solution A | |
|---|---|
| M/F RESIN | 35.0 w/w |
| BUTANOL | 35.0 w/w |
| M.I.B.K. | 30.0 w/w |
| | 100.0 |

The reservoir of the compressed air modifier was charged with a solution containing the following composition on a v/v basis.

| Solution B | |
|---|---|
| Acetic Acid | 10.0 |
| Phosphoric Acid | 2.0 |
| M.E.K. | 88.0 |
| | 100.0 |

The resin solution "A" was applied to a number of presealed timber panels utilizing a standard siphon pot samson spray gun model SMS at 55 p.s.i. A second set of panels were prepared with air heated with solution "B" via the compressed air modifier. The drying time of the two sets of panels was noted and the following observations made.

| | DUST FREE | PRINT FREE | TAPE FREE |
|---|---|---|---|
| (a) C.A.M. | 20 | 40 | 60 |
| (b) CONTROL | 30 | 60 | Not Attained |

* NOTE 1: All times are in minutes
** NOTE 2: Solvent resistance checked with Butanol.

EXAMPLE 4

A proprietary unsaturated polyester spraying putty was prepared according to the following ratios on a volumetric basis.

| | |
|---|---|
| Part A Base | 10 |
| Hardener | 1 |
| | 11 |

The reservoir of the compressed air modifier was charged with a blend of organic tertiary amines according to the following formula on a volumetric basis.

| | |
|---|---|
| N.N-Dimethyl Ethanolamine | 40 |
| Triethylamine | 20 |
| N-Methyl Morpholine | 40 |
| | 100 |

The spraying putty was then applied to a number of fibreglass panels using a Cevilbiss CGB-502 putty gun at 50 p.s.i. using in turn standard compressed air and then modified compressed air as supplied by the apparatus herein described. The drying time of the two sets of panels was noted and the following observations made at 20° centigrade.

| | TACK FREE | SANDING TIME |
|---|---|---|
| (A) C.A.M. | 5 mins | 15 mins |
| (B) COTROL STD. | 10 mins | 45 mins |

EXAMPLE 5

In another experiment a further application used was established when standard metal panels were treated with modified compressed air. It has been established that certain chemicals retard the oxidation of metal surfaces as described in such teachings as Mann, Laner & Holting, "Industrial Engineering Chemistry", 28 (1936) and Cordoro, "Amines & Corrosion Control", National Engineer 50 (1946).

The reservoir of the compressed air modifier was charged with a mixture of a nitrite salt and a tertiary amine in the following proportions.

| | |
|---|---|
| Ammonium Nitrite | 5.0 v/v |
| Cyclotiexylamine | 95.0 v/v |
| | 100.0 |

A number of mild steel metal panels were treated at 25 p.s.i. with the modified compressed air emanating from the unit while a further set were left untreated. All the panels were subjected to an environment of 100% relative humidity above a saline solution after which the following results were obtained.

| | 24 HRS | 48 HRS | 72 HRS |
|---|---|---|---|
| TREATED PANELS | No Effect | No effect | Isolated Flash Rusting |
| CONTROL PANELS | Some Flash Rusting | Intensification of Rusting Apparent | Corrosion well Established |

The experiment resulted in the conclusion that the modified compressed air was effective in minimizing the corrosion potential of any situation where water and iron surfaces come into contact. Since the pipes of a compressed air system usually contain certain amounts of water at any one time, then the presence of the chemical ingredients mentioned in the experiment would be beneficial in maintaining the longevity and serviceable use of any compressed air line susceptible to corrosive action.

EXAMPLE 6

In an experiment designed to ascertain a further use for the apparatus that is the subject of this specification, a quantity of contaminated grain was treated with vapors generated by the unit to ascertain its affect on the control of vermin.

The chemical Di-n-butylamine has been found to be effective in the control of weevils in various grain stocks according to Mayer & Phillips, "Journal of Economic Entomology", 36 (1943).

The experiment involved the simulation of a silo environment by filling two identical clear glass cylinders with contaminated grain. The first cylinder had standard compressed air introduced via a valve at the base at a constant pressure of 25 p.s.i. while the second received air at the same pressure from the compressed air modifier which had been filled with 100% Di-B-butylamine. Examination of the two cylinders after a period of sixty minutes revealed that the cylinder connected to the compressed air modifier demonstrated little or no activity while the control remained unchanged. The possibility of utilizing the apparatus for control of vermin or in the applications of insecticides or pesticides was established.

It is clear from the foregoing examples that the present invention may be used in applications other than to substrate coating. Furthermore, within the field of, substrate coating, the present invention may be used for apply coatings other than paints as well as paints of various specifications.

Clearly, the present invention is capable of numerous modifications without departing from the scope of the present invention as broadly defined herein. For example, the chemical agent can be introduced into the mixing chamber by way of high pressure injection as an alternative to the pneumatic driven arrangement and Venturi jets described. Thus, the supply of chemical agent may be independent of the compressed air supply.

Embodiments of the present invention are adapted to insertion in any conventional compressed air system without requiring modification to said system. The device is simple, easy to operate and portable thus ameliorating many of the deficiencies of the prior art.

I claim:

1. An apparatus for introducing a vaporized liquid chemical agent into a compressed air supply system comprising: an air/liquid chemical agent mixing chamber comprising an air supply inlet and means to supply liquid chemical agent from a liquid chemical agent storage chamber into said mixing chamber via said inlet in combination with said air in response to changes in pressure within said mixing chamber, said mixing chamber containing baffle means to promote turbulence and to extract airborne droplets of said liquid chemical agent from within said mixing chamber, liquid chemical agent outlet means connected to said mixing chamber for removing accumulated liquid chemical agent from said mixing chamber, said mixing chamber further comprising outlet means for passing air and vaporized chemical agent out of said mixing chamber.

2. An apparatus as claimed in claim 1 wherein there is a common inlet comprising said air supply inlet and the liquid chemical agent inlet means.

3. The apparatus of claim 1 or 2 wherein the mixing chamber is connected via a return pipe and a pressure sensitive valve to said liquid chemical agent storage chamber.

4. The apparatus of claim 3 wherein there is a clearance between the baffle means and the bottom of the mixing chamber.

5. A method of introducing a mixture of vaporized liquid chemical agent in air which comprises: combining a liquid chemical agent with compressed air of a predetermined pressure and introducing such into an air/liquid chemical agent mixing chamber; spraying the combined air and chemical liquid, in a non-vapor phase, into said mixing chamber in dependence upon changes in pressure within said mixing chamber; vaporizing said liquid chemical agent in said mixing chamber; producing turbulence in, and extracting airborne liquid chemical agent droplets from, said chamber by baffle means, removing liquid chemical agent formed by said droplet extraction from said mixing chamber; and passing a mixture of vaporized liquid chemical agent and air out of said mixing chamber.

6. A method according to claim 5 wherein said spraying of said liquid chemical agent and air into said mixing chamber is substantially at right angles to a plurality of perforated plates; and wherein air that has passed through said plurality of perforated plates exits said mixing chamber via an outlet surrounded by a perforated enclosure.

* * * * *

UNITED STATES PATENT AND TRADEMARK OFFICE
CERTIFICATE OF CORRECTION

PATENT NO. : 4,948,390

DATED : August 14, 1990

INVENTOR(S) : Antonio SOLA et al.

It is certified that error appears in the above-identified patent and that said Letters Patent is hereby corrected as shown below:

On the title page, Item [30], "PH7456" should read --PH7546--.

Signed and Sealed this

Fifth Day of May, 1992

*Attest:*

DOUGLAS B. COMER

*Attesting Officer*

*Acting Commissioner of Patents and Trademarks*